United States Patent
Meo et al.

(10) Patent No.: US 11,844,171 B2
(45) Date of Patent: Dec. 12, 2023

(54) METHOD FOR THE DETECTION OF AT LEAST ONE LOADING PARAMETER OF A CLOSED SPACE BY A DETECTION DEVICE, TRAINING METHOD, COMPUTER PROGRAM, COMPUTER-READABLE DATA CARRIER, AND DETECTION DEVICE

(71) Applicant: RATIONAL AKTIENGESELLSCHAFT, Landsberg am Lech (DE)

(72) Inventors: Fernando Meo, Landsberg am Lech (DE); Elisa Pizzolato, Landsberg am Lech (DE); Daniel Schwalb, Landsberg am Lech (DE); Philipp Roediger, Landsberg am Lech (DE)

(73) Assignee: RATIONAL AKTIENGESELLSCHAFT, Landsberg am Lech (DE)

( * ) Notice: Subject to any disclaimer, the term of this patent is extended or adjusted under 35 U.S.C. 154(b) by 641 days.

(21) Appl. No.: 16/978,937

(22) PCT Filed: Mar. 7, 2019

(86) PCT No.: PCT/EP2019/055765
§ 371 (c)(1),
(2) Date: Sep. 8, 2020

(87) PCT Pub. No.: WO2019/170830
PCT Pub. Date: Sep. 12, 2019

(65) Prior Publication Data
US 2021/0400778 A1    Dec. 23, 2021

(30) Foreign Application Priority Data
Mar. 7, 2018 (IT) .................. 102018000003342

(51) Int. Cl.
*H05B 6/70* (2006.01)
*H05B 6/64* (2006.01)
(Continued)

(52) U.S. Cl.
CPC ............... *H05B 6/705* (2013.01); *F24C 7/08* (2013.01); *G06N 20/00* (2019.01); *H05B 6/6447* (2013.01); *H05B 6/686* (2013.01)

(58) Field of Classification Search
CPC .......... F24C 7/08; F24C 7/085; G01N 22/00; G06N 20/00; H05B 6/6447; H05B 6/686; H05B 6/705; H05B 6/72; Y02B 40/00
(Continued)

(56) References Cited

U.S. PATENT DOCUMENTS

| 4,210,795 | A | * | 7/1980 | Lentz | .................... | H05B 6/6432 |
| | | | | | | 219/709 |
| 6,013,907 | A | * | 1/2000 | Lee | ....................... | H05B 6/6447 |
| | | | | | | 219/718 |
| 2010/0176123 | A1 | * | 7/2010 | Mihara | .................. | H05B 6/705 |
| | | | | | | 219/746 |

FOREIGN PATENT DOCUMENTS

| DE | 102008060899 A1 | 6/2010 |
| DE | 102012006578 A1 | 10/2013 |

(Continued)

*Primary Examiner* — Quang T Van
(74) *Attorney, Agent, or Firm* — Hayes Soloway PC

(57) ABSTRACT

A method of sensing at least one load parameter of a closed chamber by a sensing device by means of electromagnetic radiation is described, in which measurements of at least one measured variable are used. A first measurement is carried out when there is a first spatial distribution of the electric field generated by the electromagnetic radiation. At least a second measurement is carried out when there is a second spatial distribution of the electric field generated by the
(Continued)

Figure 1:
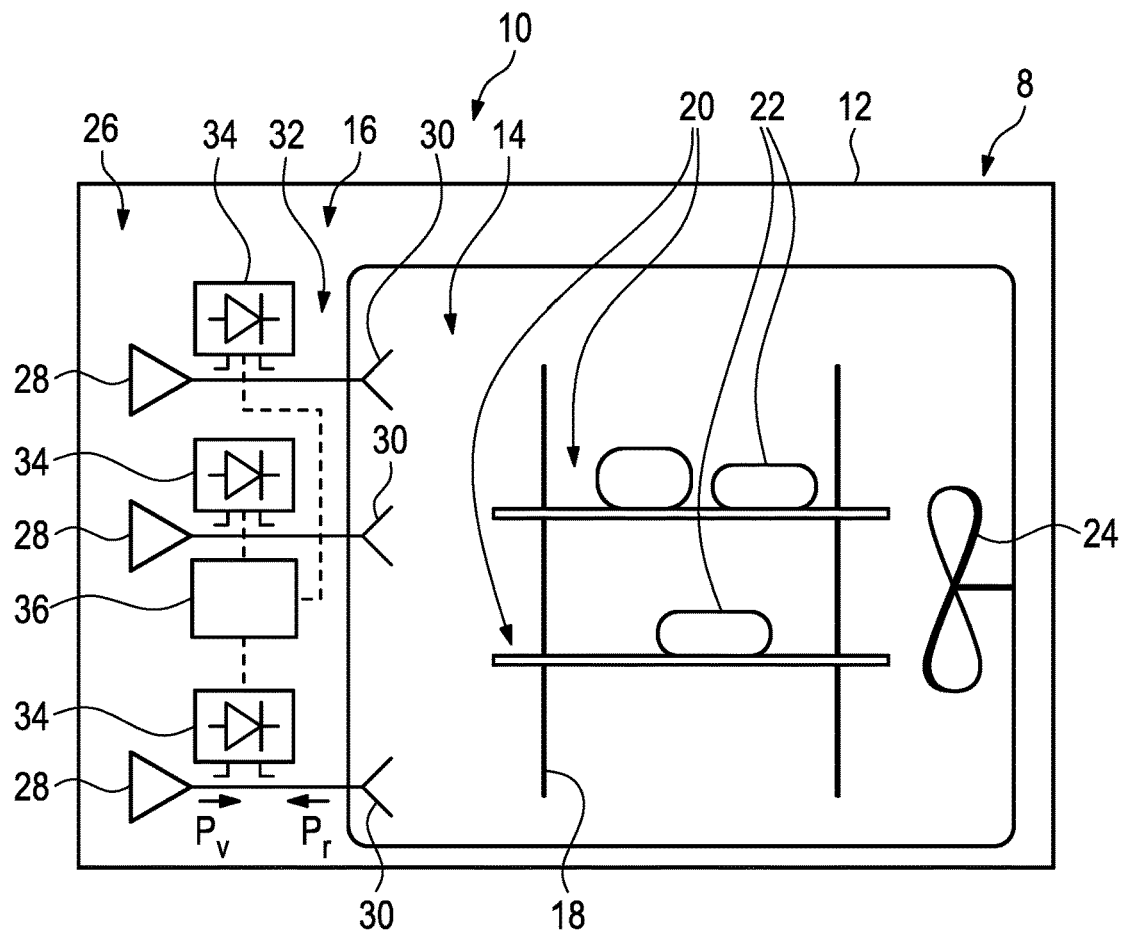

electromagnetic radiation, which differs from the first spatial distribution of the electric field.

19 Claims, 6 Drawing Sheets

(51) Int. Cl.
    *G06N 20/00*      (2019.01)
    *F24C 7/08*      (2006.01)
    *H05B 6/68*      (2006.01)

(58) Field of Classification Search
USPC ....... 219/702, 703, 704, 705, 706, 708, 710, 219/711, 716, 720, 746
See application file for complete search history.

(56) References Cited

FOREIGN PATENT DOCUMENTS

| | | | |
|---|---|---|---|
| EP | 2053315 | A2 | 4/2009 |
| EP | 2098788 | A2 | 9/2009 |
| EP | 2326141 | A1 | 5/2011 |

\* cited by examiner

METHOD FOR THE DETECTION OF AT LEAST ONE LOADING PARAMETER OF A CLOSED SPACE BY A DETECTION DEVICE, TRAINING METHOD, COMPUTER PROGRAM, COMPUTER-READABLE DATA CARRIER, AND DETECTION DEVICE

CROSS-REFERENCE TO RELATED APPLICATIONS AND PRIORITY

This patent application claims priority from PCT Patent Application No. PCT/EP2019/055765 filed Mar. 17, 2019, which claims priority from Italian Patent Application No. 102018000003342 filed Mar. 7, 2018. Each of these patent applications are herein incorporated by reference in their entirety.

The invention relates to a method of sensing at least one load parameter of a closed chamber by a sensing device by means of electromagnetic radiation. The invention further relates to a sensing device. The invention further relates to a method of training, a computer program, and a computer-readable data carrier.

Methods are known from the prior art in which a load parameter of a closed chamber, for example a cooking chamber of a cooking device, is detected by means of an optical sensor. Here, object sensing or measurement algorithms are used to infer the type of object, the position of the object in the closed chamber and/or the size of the object.

Such optical systems, which can also be referred to as sensing devices, are also known from other fields of application where several different objects may occur, for example in a production, distribution and/or sorting system.

The automated sensing of the load parameter is advantageous because it is no longer necessary for the operator or user to manually enter the relevant information.

However, in the possibilities known from the prior art for the sensing of at least one load parameter, it turned out to be disadvantageous that they are complex and therefore expensive.

In addition, the corresponding methods of sensing at least one load parameter are time-consuming, which is why they are suitable only to a limited extent for real-time monitoring. Furthermore, the optical systems cannot be used under all conditions, for example at high temperatures or in poor visibility, among others due to steam.

The object of the invention is to provide a rapid possibility of reliably sensing a load parameter so that a corresponding object can be identified.

According to the invention, the object is achieved by a method of sensing at least one load parameter of a closed chamber by a sensing device by means of electromagnetic radiation, in which measurements of at least one measured variable are used, wherein:
 a first measurement is carried out when there is a first spatial distribution of the electric field generated by the electromagnetic radiation,
 at least a second measurement is carried out when there is a second spatial distribution of the electric field generated by the electromagnetic radiation, which differs from the first spatial distribution of the electric field, and
 the at least two measurements are evaluated with regard to the at least one measured variable by means of a mathematical operation and/or mathematical transformation to obtain at least one evaluation variable from the measurement results by means of which the load parameter is determined by applying a pattern recognition which includes the at least one evaluation variable as an input variable, and/or a mathematical model which comprises the at least one evaluation variable and at least one training parameter that has been ascertained based on previous tests.

The basic idea of the invention is that the at least one load parameter of a closed chamber can be ascertained from a series of measurements comprising at least two measurements of at least one measured variable, which is also referred to as measured parameter. For this purpose, at a given (fixed) loading state of the closed chamber, at least two measurements are carried out at different spatial distributions of the electric field generated by the electromagnetic radiation, for example the microwave field, and the measurement results obtained are accordingly evaluated with regard to the at least one measured variable in order to obtain the at least one evaluation variable.

Thus, especially no fixed electric field is required during the entire series of measurements, as is the case in the prior art when measurements are carried out using electromagnetic waves. According to the invention, it is thus ensured that the entire area of the closed chamber can be covered by the electromagnetic radiation in order to obtain information regarding the loading state of the entire closed chamber or the respective load parameter, whereas with a constant spatial distribution, only part of the closed chamber would be covered by the electromagnetic radiation. Due to the several different spatial distributions of the electric field generated by the electromagnetic radiation, different areas of the closed chamber can be detected by sensors or "electromagnetically scanned".

It is not necessary to know the spatial distribution of the electric field. In this respect, these are unknown spatial distributions of the electric field generated by the electromagnetic radiation. The method of sensing the at least one load parameter is correspondingly fast due to the electromagnetic waves used, making it particularly suitable for real-time monitoring of the closed chamber.

Due to the real-time monitoring of the closed chamber, it is possible to make dynamic adjustments during operation on the basis of the at least one load parameter, in particular of a system associated with the sensing device.

In principle, electromagnetic radiation is advantageous over optical sensing, as the electromagnetic waves can penetrate the object in question and thus provide information about the interior, whereas optical sensing can only inspect the surface.

If several different measurements are carried out, a statistical evaluation of the measurement results can be made to determine the load parameter, i.e. by means of a classical analysis technique. The statistical evaluation is connected with considerably less computational effort than, for example, a simulation of the electromagnetic field, in particular the spatial distribution thereof, which is why real-time monitoring is possible, which is exactly not the case with a simulation. A simulation also constitutes a classical analysis technique.

The series of measurements may be based on the measured variable or parameter that is measured, for example, at the at least one antenna. In this respect, the measured variable is a measured variable which can be detected by sensors on the antenna side.

The mathematical operation and/or transformation can be a grouping and/or partioning of the measurement data obtained from the measurements. The (partial) data sets obtained can be further evaluated in order to obtain a corresponding evaluation variable which is incorporated into the mathematical model and/or the pattern recognition.

The evaluation of the at least two measurements with regard to the at least one measured variable may already be referred to as grouping, since the measurement results of the at least two measurements are grouped or combined accordingly. Grouping takes place in particular when the measurements are performed with respect to a plurality of measured variables and are then combined.

The mathematical model used establishes a correlation between the at least one evaluation variable and the at least one load parameter, so that a correlation of the at least one measured variable from which the evaluation variable is obtained, and the at least one load parameter can be exploited.

The mathematical model may comprise an equation, a system of equations and/or an (applied) machine learning model. The mathematical model may also be a complex and/or multidimensional regression model.

In principle, the regression model can be configured as a linear regression model, a regression tree and/or a Gaussian process regression model. Other regression models can also be considered, in particular multidimensional regression models.

The applied mathematical model may therefore correspond to or be assigned to a classical analysis technique.

Alternatively or in addition, a pattern recognition can be applied, which has at least one evaluation variable as an input variable. For this purpose, a pattern recognition module may be provided to which the evaluation variable is fed. The pattern recognition recognizes correlations or connections (patterns) between data.

The pattern recognition has been trained beforehand, which is why this involves a trained pattern recognition, so that the pattern recognition can output the at least one load parameter on the basis of the input evaluation variable.

An artificial neural network (artificial intelligence) and/or a classification or classifying procedure can be used in the pattern recognition. In this respect, the pattern recognition can be based on artificial intelligence in contrast to classical analysis techniques.

If the pattern recognition is used, a classical analysis technique is thus first carried out to ascertain the at least one evaluation variable from the measurements. After the classical analysis technique, the artificial intelligence of the pattern recognition is used to obtain the at least one load parameter based on the classically ascertained evaluation variable.

In other words, the mathematical model establishes a correlation between at least one evaluation variable obtained from the electromagnetic waves (measured variable) measured at the at least one antenna, and the at least one load parameter, wherein training parameters are used. The mathematical model is deterministic.

The pattern recognition has previously learned or trained this correlation itself.

Consequently, a different load parameter can result in a different correlation.

The electromagnetic waves at the at least one antenna can be measured or calculated, by means of which the at least one evaluation variable is determined by means of mathematical operations/transformations. Using the mathematical model or the pattern recognition, the at least one load parameter can then be inferred on the basis of the at least one evaluation variable.

In principle, the spatial distribution of the electric field generated by the electromagnetic radiation can be influenced by device parameters, load parameters and control parameters. This in turn influences the electromagnetic waves at the at least one antenna.

The device parameters are, for example, antenna parameters, i.e. the position and design of the at least one antenna, and/or device parameters, in particular cooking device parameters, which include material properties.

The load parameters may comprise material properties, for example permittivity, spatial product properties such as the volume, size, shape and/or cross-sectional ratio, and/or positional properties, for example the position in the chamber, in particular the insertion height in the cooking chamber, and/or the position in an insertion plane, in particular on an inserted cooking accessory.

The control parameters may be the power, the frequency, the phase and/or the position of a mode mixer or an electrically conductive component. If a plurality of antennae are provided which are excited simultaneously, the relative phase and/or the relative power between the simultaneously excited antennae may also be used as control parameters.

In this respect, the spatial distribution of the electric field generated by the electromagnetic radiation can be actively controlled or changed by modifying at least one of the control parameters accordingly.

For example, the different phases and/or amplitudes between the antennae can be ascertained via S-parameters, provided that phase changes are used to change the spatial distribution of the electric field generated by the electromagnetic radiation.

Thus, the control parameters are modified in order to scan the closed chamber with electromagnetic waves, whereas the other parameters are fixed, for example the at least one load parameter. The electromagnetic waves measured at the at least one antenna change and include information regarding the fixed parameters, for example the at least one load parameter.

The device parameters remain fixed during the measurement method, i.e. the device parameters do not change.

The load parameters also remain fixed during the measurement method, in particular load parameters such as the number and/or the type.

According to the invention, an evaluation variable is used which is sensitive for at least one load parameter of interest, for example the temperature of the object/item to be cooked and/or the quantity, but is invariant for other load parameters which are not of interest (disturbance parameters), for example the position of the object in the closed chamber.

Depending on the load parameters of interest or the disturbance parameters, a corresponding evaluation variable is ascertained from the measurement data via the mathematical operations/transformations, which is incorporated into the mathematical model and/or the pattern recognition.

In principle, the pattern recognition may be provided by a pattern recognition module based on an artificial neural network (artificial intelligence) and/or a classification module that uses a classification or classifying method.

The pattern recognition may also be an artificial neural network based on "deep learning", i.e. deep structured learning. In this case, the measurement data can be used directly, i.e. the raw data, to ascertain the at least one load parameter. An intermediate evaluation by means of mathematical operations/transformations can therefore be omitted.

The pattern recognition may also be a so-called "convolutional neural network".

To determine the at least one load parameter including the at least one evaluation variable obtained by means of a classical analysis technique, in principle the following methods or procedures may also be used in principle: Support Vector Machine (SVM), ensemble methods and/or "Random Forest" methods, which are usually attributed to the pattern recognition.

Discriminant analysis, for example linear discriminant analysis (LDA) and/or quadratic discriminant analysis (QDA), Naive Bayes method, nearest neighbor method or similar methods can be used for classification or classifying methods.

The pattern recognition focuses on the recognition of correlations or relationships (patterns) between data. Accordingly, the pattern recognition is not limited to a two-dimensional image evaluation.

For example, the measurement data obtained are grouped or divided individually for each antenna according to the phase, the frequency and/or the angle of rotation of a fan. In this respect, different data subsets which can be evaluated are obtained for the number of antennae.

In principle, it can also be provided that the data obtained from the measurements are used directly as input values for an appropriately trained pattern recognition, i.e. without an intermediate classical technique, in particular in a deep learning approach.

The method used to sense the at least one load parameter can also be implemented cost-effectively in a cooking device, since existing components of a cooking device can be used. The cooking device can then be extended by a sensing device by means of which the load parameter of a cooking chamber serving as a closed chamber can be easily detected.

A corresponding sensing device can also be easily retrofitted to other systems in order to detect objects which are brought into a closed chamber of the sensing device for this purpose, for example objects which are transported into the closed chamber on a conveyor belt. Drying devices or similar equipment can also be provided as systems which are extended by such a sensing device.

The sensing device can thus be a retrofit assembly for an existing process system, for example a cooking device.

The electromagnetic radiation that is fed into the closed chamber can be provided by a microwave source that emits coherent microwaves, for example, an oscillator having a narrow frequency spectrum or a semiconductor microwave source, also referred to as a "Solid State Microwave Generator" (SSMG) or "Solid State Device" (SSD). The generated electromagnetic radiation is then fed into the closed chamber via at least one antenna assigned to the microwave source, wherein the electromagnetic radiation generates the electric field in the closed chamber.

The electromagnetic radiation used (microwaves or waves in the THz range) can have a low power, which can also be referred to as sensor power. The low power or sensor power is so low that it cannot be used to heat up an item to be cooked or an object. In contrast to the sensing of the at least one load parameter, the heating up of items to be cooked in a cooking device using electromagnetic radiation (microwaves or waves in the THz range) can be done by means of a so-called heating power, which is correspondingly higher.

In this respect, sensor microwave sources designed separately from the heating means can be used in a cooking device, which only provide the electromagnetic radiation (microwaves) with a low power or sensor power. The items to be cooked can also be heated or cooked using other techniques than microwaves, for example hot air.

However, electromagnetic radiation (microwaves) can also be used to heat the items to be cooked and (simultaneously) to determine the load parameters.

In general, the method can be used for cooking devices which use hot air, steam, microwaves, infrared radiation and/or similar techniques to cook an item to be cooked.

Since electromagnetic radiation (microwaves or waves in the THz range) is used to determine the load parameter, this technique can also be used at high temperatures or with strong steam, unlike optical systems.

However, the method is not limited to cooking devices. Rather, it can be used in several fields of application in which an object is to be dried, sensed, measured or generally determined, i.e. with a corresponding sensing device which is assigned to a system.

In general, the load parameter includes information regarding the loading of the closed chamber, for example, by objects or components.

The training parameter, which is used by the mathematical model, establishes a relation/correlation comprising the at least one evaluation variable by which the load parameter can be ascertained.

The training parameter may have been determined empirically, through tests carried out previously. In this respect, the training parameter can be understood as a fit parameter for the mathematical model.

Alternatively, the training parameter is a learned parameter, i.e. a trained parameter. The corresponding training parameter may have been learned or trained using a machine learning algorithm. For example, the training parameter is ascertained by means of artificial intelligence, wherein the training parameter ascertained by means of artificial intelligence is then used in a classical mathematical model, namely an equation or system of equations.

In particular, the mathematical operations and/or mathematical transformations use statistical and/or information-theoretical techniques to obtain the at least one evaluation variable from the measurement results. The evaluation variable is thus ascertained from the measurement results of the at least two measurements by means of a classical analysis technique, namely on the basis of mathematical operations and/or mathematical transformations that use statistical and/or information-theoretical techniques. The measurement data may have previously been divided (partitioned) or grouped as described above.

According to one aspect, the spatial distribution of the electric field generated by the electromagnetic radiation is changed by modifying the spatial distribution of the electric field by means of a movement of an electrically conductive component, a mode mixer, the frequency of the electromagnetic radiation, the (relative) power of the electromagnetic radiation and/or the (relative) phase of the electromagnetic radiation. In this respect, there are several possibilities to change the spatial distribution of the electric field between the individual measurements of the at least one measured variable. The settings of the microwave source can be left unchanged, for example a fixed frequency and a fixed relative phase in the case of several antennae, wherein the spatial distribution is changed on the basis of a mode mixer or a movement of the electrically conductive component. The settings of the microwave source can also be changed in addition to the operation of the mode mixer between the individual measurements, for example the frequency.

The above parameters can also be considered as control parameters via which the spatial distribution of the electric field generated by the electromagnetic radiation is influenced or controlled. As already mentioned above, a plurality of control parameters can be changed simultaneously to change the spatial distribution.

The frequency of the electromagnetic radiation, the movement of an electrically conductive component or the mode mixer can be used to change the spatial distribution, provided that only one antenna is provided or a plurality of antennae are provided, but only one antenna is active.

If a plurality of antennae are provided and at least two antennae are active simultaneously, the spatial distribution can be changed by the frequency of the electromagnetic radiation, the movement of an electrically conductive component or the mode mixer, the relative phase between the antennae and/or the relative power between the antennae. Thus, if there are several active antennae, the relative phase between the antennae and/or the relative power between the antennae can be provided as control parameters in addition to the control parameters if only one antenna is active.

Depending on the control parameter for changing the spatial distribution, specific measured variables are available. For example, the change of the spatial distribution can be sensed particularly easily via the scattering parameters or network parameters, provided that the change of the spatial distribution of the electric field was caused by a change of the relative phase.

The spatial distribution of the electric field can also be modified via the phase as a control parameter by exciting at least two antennae simultaneously and using a phase shifter, for example to adjust a phase difference between the antennae. The respective phases need not be absolutely known, so that one sweep of a phase is sufficient. In this respect, it is not necessary to carry out an absolute calibration of the antennae, since, for example, the ratio of the amplitudes is measured while a phase runs through a cycle (from −180° to 180°). The relative changes in the measured electromagnetic waves then provide information about the at least one load parameter at different spatial distributions.

For example, the gradient of the amplitude ratio (backward/forward) with respect to the phase shift is calculated for each frequency and antenna. Then, a histogram is ascertained (mathematical operation, especially mathematical representation) to extract an evaluation variable.

The evaluation variable can describe the shape of the obtained histogram, for example the mean value, the variance, the symmetry value or other parameters of the histogram.

Alternatively, it may be provided that network parameters are measured first, to then numerically ascertain outgoing waves, i.e. using $$b = S*a,$$

where b is a vector of the outgoing waves, S is the scattering matrix (scattering parameters), and a is a vector of the incoming waves (also called excitation vector).

Starting from the vector of the outgoing waves, at least one evaluation variable can then be ascertained.

An absolute calibration can be provided. However, this is not absolutely necessary.

If the respective evaluation variable requires that the network parameters are absolutely calibrated, a so-called data multiplication may be applied, in which the calibration level of the network parameters is synthetically changed by shifting the phase of the scattering parameters.

As already explained, the spatial distribution can be changed if only one antenna is active, even if a plurality of antennae are provided.

The spatial distribution can also be changed if a plurality of antennae are active at the same time.

In particular, a fan wheel arranged in a closed chamber is used as the mode mixer. Accordingly, the components already present in a cooking device can be used to easily change the spatial distribution of the electric field generated by electromagnetic radiation between the individual measurements of the series of measurements. A fan wheel may also be provided in general at a sensing device to circulate the atmosphere in the closed chamber, to extract air and/or to introduce air into the closed chamber.

A further aspect provides that the at least one measured variable is the amplitude, the phase, a network parameter, the power of forward electromagnetic waves, the power of backward electromagnetic waves and/or the ratio of the powers of the forward electromagnetic waves and the backward electromagnetic waves. The corresponding power(s) can be ascertained by decoupling the electromagnetic waves through directional couplers associated with the respective antenna via which the electromagnetic radiation is fed into the closed chamber. The respective power of the decoupled electromagnetic waves can then be measured using a measuring unit.

In general, the amplitudes, phases and/or network parameters can be set in relation to each other.

The amplitude or phase can be the amplitude or phase of the forward electromagnetic waves or the amplitude or phase of the backward electromagnetic waves.

The forward electromagnetic waves are the electromagnetic waves that travel from the at least one microwave source to the associated antenna (incoming waves), whereas the backward electromagnetic waves are those that are reflected back from the closed chamber into the associated antenna, also called outgoing waves.

The electromagnetic waves may be reflected back by the antenna itself due to a poor adjustment of the antenna. However, the electromagnetic waves can also be reflected back if the antenna is well adjusted, for example, due to the loading of the closed chamber with at least one appropriate object.

Furthermore, the position of a fan wheel or another electrically conductive component in the closed chamber can have an influence on the reflection behavior. In this respect, the reflected electromagnetic waves can be used to draw conclusions about the loading characteristics.

In general, the at least one measured variable, in particular the at least one network parameter, can be scattering parameters, other parameters or combinations thereof, which can be measured accordingly. The other parameters are, for example, phase differences of forward or backward waves, in particular in the case of antenna pairs, and/or amplitude or power ratios.

Instead of one measured variable, it is also possible to detect a plurality of measured variables which are then combined, for example the ratio of the powers of the forward electromagnetic waves and the backward electromagnetic waves.

Several measured variables or the measurement data associated with the measured variables can be combined or grouped, in particular by any combination of the control parameters.

The measurement data relating to at least one measured variable can also be divided, for example into different ranges, in particular different frequency ranges, in order to generate corresponding partial data sets which can be evaluated separately from each other.

A further aspect provides that a plurality of antennae are provided, via which in particular coherent electromagnetic waves are respectively fed into the closed chamber. The electromagnetic radiation can be fed into the closed chamber via a single antenna, a pair of antennae, several pairs of antennae, or other combinations of several antennae. It is therefore also possible that only one of the several antennae is active at the same time.

The coherent electromagnetic waves can be provided by a common microwave source for all antennae or by several microwave sources, each assigned to one antenna. The microwave sources are then coupled together such that the electromagnetic waves are coherent. A control and evaluation unit assigned to the sensing device can control or regulate the phase and/or amplitude relationship(s) of the electromagnetic waves fed in via the several antennae.

In particular, the phase reference of the electromagnetic waves fed into the closed chamber via the several antennae is fixed during the measurement. This is the case, for example, if the spatial distribution of the electric field generated by the electromagnetic radiation is changed in a way other than the phase, for example by a mode mixer, a movement of an electrically conductive component, the frequency of the electromagnetic radiation and/or the power of the electromagnetic radiation. However, a fixed phase reference can also be a defined relative phase.

The at least one load parameter can be the type of object, the position of the object within the closed chamber, the volume of the object, the quantity of the object, the temperature of the object, the aspect ratio of the object, the number of objects and/or the state of the object (internal and/or external), or the at least one load parameter comprises information regarding parts present in the closed chamber. Accordingly, different parameters can be detected by means of the electromagnetic radiation by performing a plurality of measurements at different spatial distributions of the electric field. The electromagnetic radiation can penetrate into the respective object, which makes it easy to determine the respective variables.

The aspect ratio corresponds to the volume-to-area ratio. In this respect, it can be determined whether, for example, five parts with a first volume or one part with a second volume are arranged in the closed chamber, the second volume being five times larger than the first volume.

The position of the object can be the three-dimensional position of the object in the closed chamber. Consequently, the height of the object in the closed chamber, or a corresponding insertion level in a cooking chamber of a cooking device in which the object or the item to be cooked is placed, for example by means of an accessory, can be inferred.

It is also possible to detect the position and/or the quantity of the part, e.g. of a cooking accessory or a component in the closed chamber, which also constitutes a load parameter of the closed chamber.

Furthermore, combinations of loads can be detected. For example, the load parameter includes information regarding the position of the object within the closed chamber as well as the quantity of components in the closed chamber which may be part of the sensing device, for example components of a transport system via which the object is transported through the sensing device.

In principle, different load parameters can therefore be of interest.

Since a real-time monitoring is possible, changes in the occupancy of the closed chamber can also be quickly detected, for example, the introduction of new objects, in particular new items to be cooked and/or volume changes such as the rising of an item to be cooked (baked goods). Again, it is not necessary for the operator to manually enter the relevant information regarding the object, as this can be ascertained automatically, in particular the number of objects, the volume and the quantity.

Cooking accessories present in the cooking chamber, which are usually made of metal, have a significantly lower microwave absorption compared to items to be cooked. However, due to its specific reflective properties, the cooking accessories have an influence on the spatial distribution of the electromagnetic field and thus on the measurements using electromagnetic radiation. In this respect, the evaluation is based on an evaluation variable by means of which it is possible to make a clear distinction between items to be cooked and cooking accessories. This makes it possible to distinguish between items to be cooked and cooking accessories.

According to a further aspect, the at least one evaluation variable is a minimum value of the measurement results, a maximum value of the measurement results, a value of a mathematical transformation of the measurement results and/or a value of a mathematical representation of the measurement results, in particular a joint moment, a value of the distribution of the measurement results, a derivative, a gradient, the integrated measurand, a probability distribution such as a histogram and/or parameters of the probability distribution or of the histogram, for example the mean value, the variance, a symmetry value (skewness), the kurtosis and/or the standard deviation, at least one parameter of information theory such as the entropy, the joint entropy, the conditional entropy, the differential entropy, the mutual information and/or the Kullback-Leibler divergence, a sum, a projection and/or a Taylor representation. From the series of measurements or the measurement results, different evaluation variables can be derived which can be used individually or in combination with each other to determine the load parameter.

In particular, at least one evaluation variable can be a joint moment, for example the covariance, the co-kurtosis and/or the co-skewness.

The at least one evaluation variable can therefore be obtained directly from the measurement data (or a subset/combination of the measurement data), for example as the minimum value of the measurement data or measurement results and/or the maximum value of the measurement data or measurement results.

The at least one evaluation variable can be obtained from a mathematical operation, for example a derivative, a gradient and/or an integrated measurand.

The at least one evaluation variable can also be a value of a mathematical transformation of the measurement results, for example a Fourier, Laplace and/or Wavelet transformation.

The at least one evaluation variable can be a value of a mathematical operation in the form of a mathematical representation of the measurement results, for example a value of the distribution of the measurement results or a probability distribution such as a histogram and/or a parameter of the (multi-variable) probability distribution or histogram. This can be the mean value, the variance, a symmetry value, the kurtosis and/or the standard deviation. For example, the multi-variable probability distribution is a common probability and/or a conditional probability.

The at least one evaluation variable can also be at least one parameter of information theory, for example the entropy, the joint entropy, the conditional entropy, the differential entropy, the mutual information and/or the Kullback-Leibler divergence.

In addition, the at least one evaluation variable can be characteristics from one or more data group(s), for example a sum, an integral, a projection and/or a Taylor representation.

In general, the at least one evaluation variable can also be at least one other statistical parameter.

Among other things, it may be provided that the measurement results are first transformed, for example by means of a Fourier transformation, in order to be able to infer specific evaluation variables and then the associated load parameters in a simple manner.

The (frequency) distribution of the measurement results, i.e. a mathematical representation of the measurement results, can also be evaluated, for example by ascertaining the area under a distribution curve, i.e. the integrated measurand, and/or a standard deviation of the distribution of the measurement results.

The mathematical transformation can be a Laplace transformation or a Fourier transformation. A mathematical extension such as a Taylor series and/or a linear transformation (linear algebra) can also be provided to find invariants and a basis, for example singular value decomposition and/or principal component analysis.

The derivative of the (frequency) distribution of the measurement results serving as an evaluation variable can be the first derivative or a higher-order derivative of the corresponding distribution. The distribution may have been smoothed or mathematically fitted beforehand in order to obtain a continuous or at least partially differentiable function.

In general, the evaluation of the at least two measurements with regard to the at least one measured variable can therefore be based on a mathematical representation of the measurement results, for example a frequency distribution (distribution of the measurement results), a mathematical transformation (distribution) of the measurement results or the direct measurement results. This can be described as a statistical approach for determining the load parameter.

Other measured variables of sensors can also be used, so that, for example, a cooking chamber temperature, a core temperature of an item to be cooked, a humidity, a browning value or a temperature within the closed chamber is taken into account in the evaluation.

The other measured variables can be incorporated into the mathematical model as well as in the pattern recognition.

When training the pattern recognition, the other measured variables can be provided as input and/or output parameters.

During the evaluation, intermediate variables of the measured variables can also be generated first, for example by derivatives of the measured variables, in particular first-order or higher-order derivatives.

In general, the derivative can provide that a measured variable is derived after another measured variable.

In particular, it is possible that one or more mathematical representation(s) and/or mathematical transformation(s) are used separately or combined with each other in order to ascertain the evaluation variable therefrom.

The evaluation of the at least two measurements is therefore a classical analysis technique.

According to one embodiment, several evaluation variables are determined, which are incorporated into the pattern recognition and/or the mathematical model. The mathematical model and/or the pattern recognition can correlate a corresponding load parameter with the respective evaluation variables, so that predictions can be made via the mathematical model and/or the pattern recognition with regard to the load parameter using the (previously classically) ascertained evaluation variables, for example with regard to the state of the object, for example the state of ice cream in an ice cream production system. The volume of the object can also be easily ascertained by means of the mathematical model or determined on the basis of the pattern recognition.

In general, all of the above-mentioned evaluation variables can be combined, i.e. they can be incorporated into the mathematical model or fed into the pattern recognition to determine a corresponding load parameter.

In other words, the evaluation variable that is incorporated into the mathematical model or pattern recognition can be determined by performing a plurality of mathematical operations and/or transformations in succession.

At least one of the above mathematical operations and/or transformations is applied to the measurement data to determine the at least one evaluation variable.

The object of the invention is to carry out a combination of the above-mentioned mathematical operations and/or transformations so that at least one evaluation variable is determined which is invariant with respect to load parameters which are not of interest, but which is sensitive to the at least one load parameter of interest.

The method according to the invention can generally be referred to as an E-field chamber scanning method, since the chamber or closed room, for example the cooking chamber, is scanned by means of the electromagnetic field. Here, measurement data of the electromagnetic waves are detected and stored at the at least one antenna.

The measurement data are then processed by the control and evaluation unit, which comprises a processor, by performing mathematical operations and/or mathematical transformations to ascertain the at least one evaluation variable.

The ascertained evaluation variable is used in the mathematical model and/or the pattern recognition to determine the at least one load parameter of interest.

Based on the at least one load parameter of interest, the control and evaluation unit can adapt a process, for example a cooking process, and/or make a prediction.

For example, the heating power during the cooking process is adjusted on the basis of the ascertained load parameter of interest in order to achieve the optimum cooking result.

For example, the mathematical model establishes a relationship between at least two evaluation variables, via which the load parameter is inferred. Consequently, the mathematical model can include an equation that relates at least two evaluation variables to each other, appropriate training parameters being provided.

The pattern recognition can receive at least two evaluation variables as input variables to ascertain the at least one load parameter.

In general, further measured variables can also be incorporated, for example measured variables from sensors such as the temperature in the closed chamber or a temperature of the object itself. These further measured variables can also be mathematically transformed or evaluated first, so that, for example, the derivative or an integrated measurand of a measured variable is also used.

According to a further embodiment, several evaluation variables are determined which are used, among other things, as input parameters for a machine learning algorithm. The machine learning algorithm thus receives, among other things, the various evaluation variables in order to learn correlations between the evaluation variables derived from the measurement results and the at least one load parameter. In this respect, the machine learning algorithm receives additional information regarding the at least one load parameter during a training phase, in particular information regarding several load parameters, in order to be able to learn the corresponding relationships (patterns). An (automatic) classifier, i.e. the application of a classification or classifying method, and/or a neural network can be used for this purpose.

Furthermore, the machine learning algorithm can obtain further data, for example, further measured variables from sensors such as the temperature of the closed chamber and/or the temperature of the object. These additional measured variables can also be used for training the machine learning algorithm.

The training can be performed continuously to improve the accuracy in a continuous and automated way.

In particular, the machine learning algorithm is assigned to the pattern recognition or applies the pattern recognition to the trained machine learning algorithm.

Basically, the training of the pattern recognition can be carried out as described below:

The pattern recognition, for example the artificial neural network and/or the classification or classifying module, is trained with set training data, the set training data comprising at least one evaluation variable and at least one actual load parameter, the at least one evaluation variable having been obtained from measurement results of at least two measurements with respect to at least one measured variable by means of mathematical operations and/or mathematical transformations, the measurements having been carried out at two different spatial distributions of the electric field generated by electromagnetic radiation, comprising the following training steps:

forward feeding of the pattern recognition to be trained, in particular the artificial neural network and/or the classification or classifying module, with the set training data;

ascertaining of at least one load parameter by means of the pattern recognition, in particular the artificial neural network and/or the classification or classifying module;

determination of an error between the ascertained load parameter and the actual load parameter; and change of weighting factors of the pattern recognition by feeding back the pattern recognition, in particular the artificial neural network and/or the classification or classifying module, with the error.

The error determined between the ascertained load parameter and the actual load parameter is a corresponding deviation of the ascertained load parameter from the actual load parameter. By means of the corresponding deviation or error, the pattern recognition can adjust internally used weighting parameters to minimize the error or deviation.

For example, the mathematical operations and/or the mathematical transformations use statistical and/or information-theoretical techniques to obtain at least one evaluation variable.

In particular, the at least one training parameter is ascertained by the machine learning algorithm, for example in the form mentioned above, wherein the correspondingly ascertained training parameter is incorporated into the mathematical model, the result of which is then compared with the actual load parameter. The machine learning algorithm is thus configured to ascertain the at least one training parameter. The ascertained training parameter can then be used by the mathematical model.

A further aspect provides that the evaluation of the at least two measurements is effected in an automated manner, so that the at least one evaluation variable is determined in an automatic way to automatically ascertain the load parameter.

As soon as the sensing device has been trained, the at least one load parameter can thus be ascertained automatically so that manual input by the user of the sensing device is no longer necessary. In this respect, the user-friendliness of a cooking device having a sensing device, for example, is considerably improved, as the user only has to enter the desired cooking result, for example "medium", "rare" or "well done" for steak.

Furthermore, the invention relates to a sensing device for a system, comprising a closed chamber and a control and evaluation unit, wherein the sensing device, in particular the control and evaluation unit, is configured to carry out a method of the aforementioned type and/or to ascertain at least one training parameter for a mathematical model which comprises at least one evaluation variable from measurements of at least one measured variable at different spatial distributions of an electric field generated by electromagnetic radiation fed in. The sensing device is thus configured to (automatically) ascertain the load parameter, wherein no input with regard to the object is required from the user.

Furthermore, the sensing device can be configured to be trained accordingly so that it can be used to ascertain the load parameter (in an automated manner) after the training phase is completed.

The sensing device can be used in a cooking device, a production system, a transport system, a sorting system, a distribution system and/or any other processing system to detect a load parameter of the closed chamber into which an object to be sensed is placed.

In principle, each measurement of the at least one measured variable yields a data set, also referred to as measurement data or raw data, which is evaluated accordingly, in particular by means of classical analysis techniques, in order to obtain the at least one evaluation variable which is incorporated into the (likewise classical) mathematical model or the pattern recognition (based on artificial intelligence).

The evaluation variable is thus based on the measurement data or measurement results of the previously performed measurements. In other words, the measurement data or measurement results are evaluated, for example mathematically transformed and/or statistically evaluated, to obtain the evaluation variable.

A further aspect provides that the data set obtained by the respective measurement is divided or partitioned, so that data subsets are created which can be accordingly evaluated separately from each other. In this way, only those data subsets can be evaluated that are considered relevant. Among other things, disturbing effects can be suppressed. For example, the data subsets are subdivided on the basis of different control parameters, for example the frequency of the electromagnetic radiation, in particular a frequency range of 2.4 GHz-2.43 GHz or a frequency range of 2.425 GHz to 2.5 GHz. Alternatively, the data subsets can be assigned to the antennae. The phase and/or the angle of rotation of a fan can also be used to divide the measurement data into data subsets.

The corresponding data subsets can overlap (at least partially).

The individual data subsets can each be evaluated in the same or in different ways, i.e. with regard to the same or a different evaluation variable.

The evaluation variables obtained from the individual data subsets can then also be subsequently used in different ways, for example by means of the pattern recognition and/or the mathematical model, in order infer the at least one load parameter.

It is also possible that only a partial data set or part of the partial data sets is further processed.

In general, it is possible with the method to distinguish between parameters of interest and disturbance parameters with regard to the at least one load parameter. This distinction can depend on the cooking process or case of application, so that in one case a load parameter is a parameter of interest, whereas the same load parameter is a disturbance parameter in another case.

In one example embodiment, the type of items to be cooked and/or the total volume of items to be cooked is a load parameter of interest, whereas the position in the plane and/or the shape of the items to be cooked is a disturbance parameter.

In order to ascertain the respective at least one load parameter of interest, at least one corresponding evaluation variable is determined from the measurement data obtained from the measurements, which correlates with the at least one load parameter of interest, whereas this at least one evaluation variable is quasi-invariant to the disturbance parameters.

For example, measurements with respect to at least one measured variable are carried out via several antennae, measuring points being detected for each frequency.

The measurement data obtained are then divided into partial data sets, each of which is assigned to one antenna (mathematical operation). Then the derivatives/gradients are ascertained for each partial data set over the frequency (mathematical operation).

From the data thus obtained, a histogram is then generated (mathematical operation, in particular mathematical representation), from which in turn a parameter is ascertained (mathematical operation), for example the width and/or height of the histogram.

The ascertained parameter of the histogram then represents the evaluation variable that is incorporated into a mathematical model.

A further evaluation variable that was merely obtained by summing the frequency for all antennae (mathematical operation) can further be incorporated into the mathematical model.

In addition, further sensor data, such as the humidity, can also be incorporated into the mathematical model.

In a further example, the spatial distribution is generated by relative phase and/or frequency changes of electromagnetic waves emitted by several, in particular four, antennae. The corresponding scattering parameters (S-parameters) are measured to numerically ascertain an outgoing wave for the respective spatial distribution using the incoming wave. For example, the incoming wave is known due to the control parameters.

The network parameters can serve as a measured variable, via which it is possible to calculate the amplitude of the backward wave at each antenna.

The corresponding measurement data obtained are divided into partial data sets for the respective antenna (mathematical operation). Furthermore, the derivative of each partial data set can be calculated via the frequency (mathematical operation).

Afterwards, a histogram can be established for each antenna over all frequencies (mathematical operation, in particular mathematical representation), of which one parameter, for example the width, serves as an evaluation variable that is incorporated into a regression model.

Alternatively, the derivative can be calculated over the phase for each partial data set (mathematical operation).

In addition, the evaluation variable can be used as an input variable for pattern recognition, for example a classifier.

Instead of the width and/or the height of the histogram, it is also possible to ascertain the mean value, the variance, a symmetry value and/or the kurtosis as an evaluation variable which is/are incorporated in a mathematical model and/or a pattern recognition.

The above explanations show that the evaluation variable can be obtained from the measurement data in many different ways, wherein several mathematical operations/transformations can be carried out one after the other.

Figure 2:
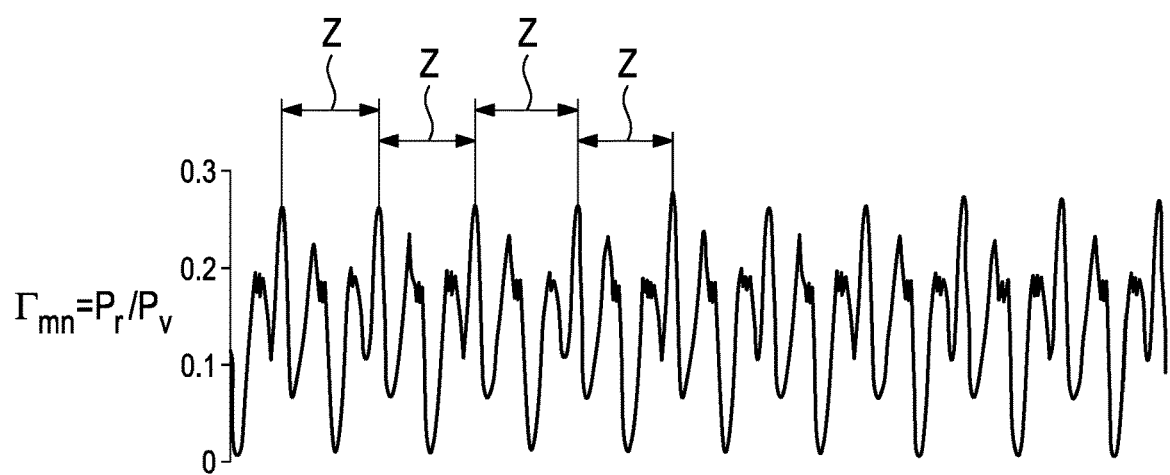
Figure 3:
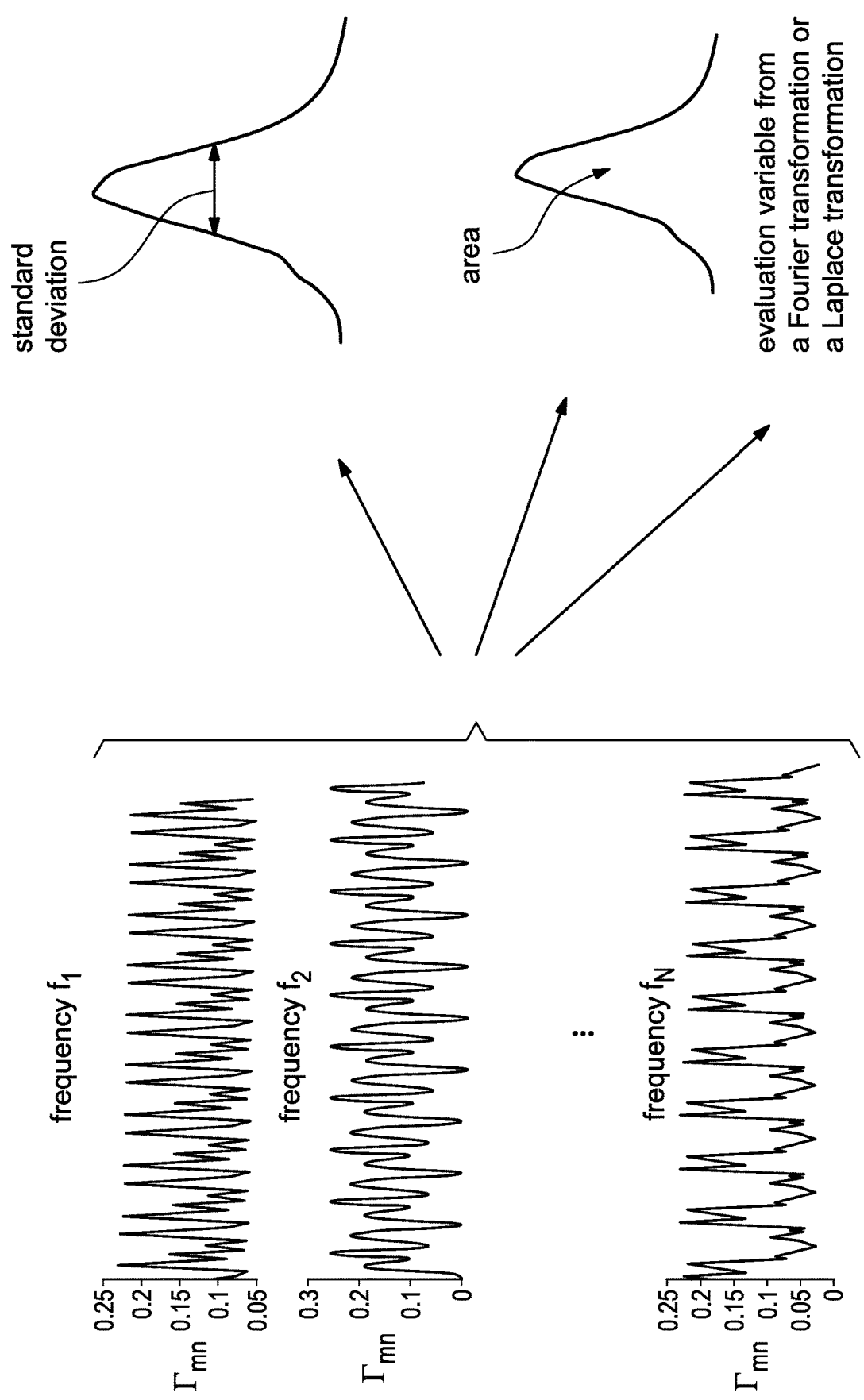
Figure 4:
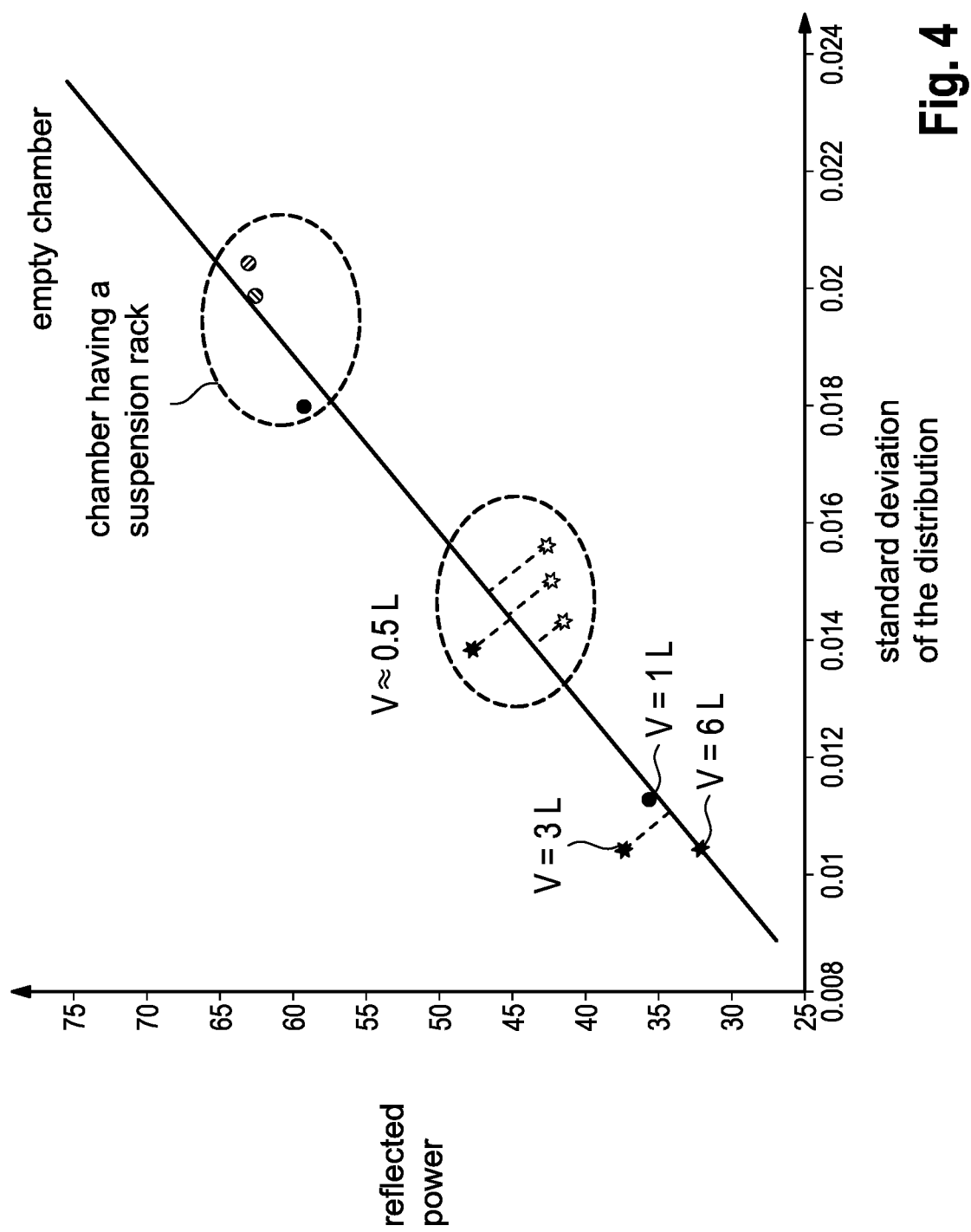
Figure 5:
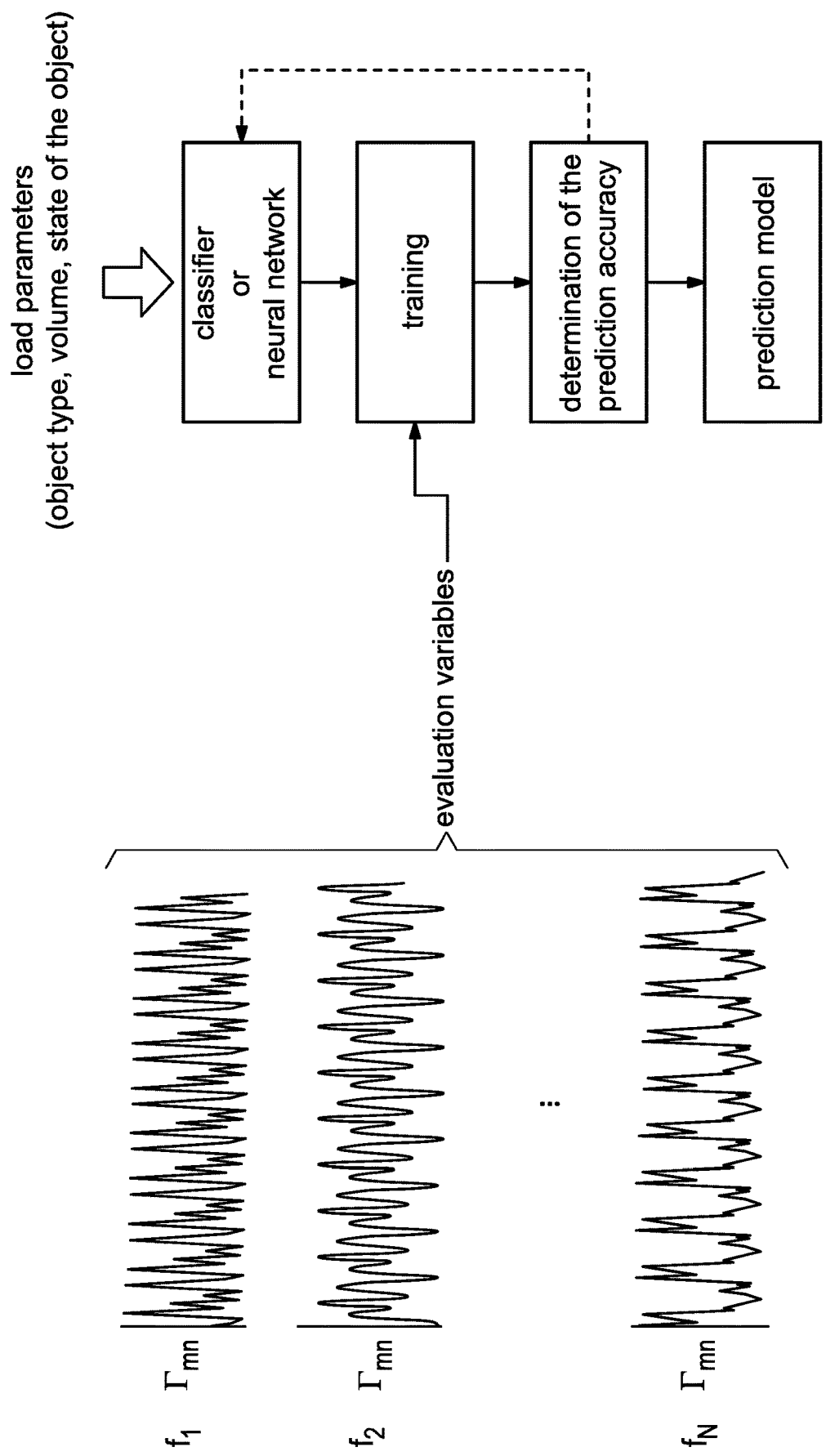
Figure 6:
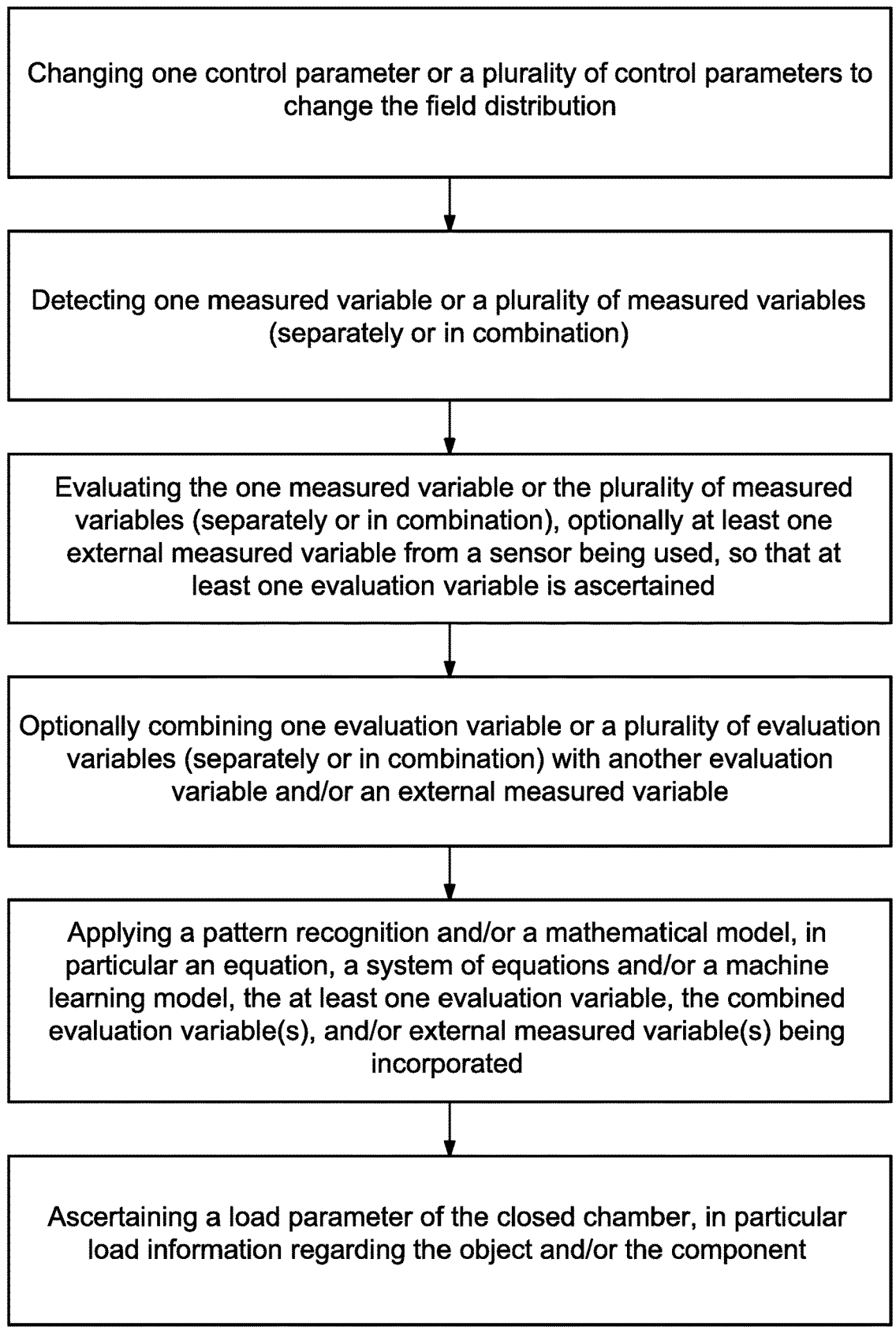
Figure 7:
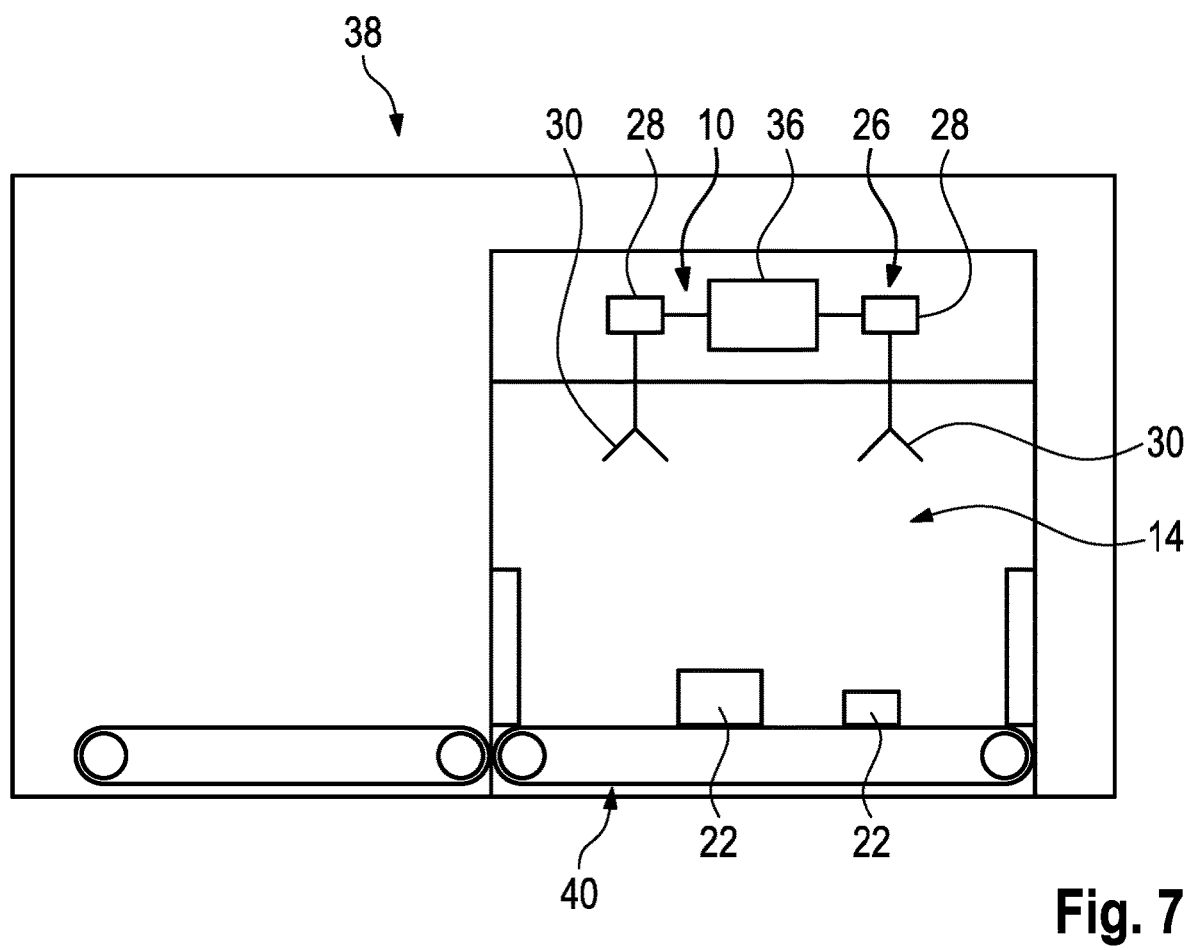

Further advantages and characteristics will become apparent from the description below and from the drawings to which reference is made and in which:

FIG. 1 shows a schematic diagram of a cooking device having a sensing device according to the invention by means of which a method according to the invention can be performed, FIG. 2 shows a measured curve of a measured variable as provided according to the invention, FIG. 3 shows a schematic overview to illustrate a part of the method according to the invention, in which different evaluation variables are obtained from a series of measurements at different spatial distributions of the electric field generated by the electromagnetic radiation, FIG. 4 shows a schematic representation of a mathematical model which can be used in the method according to the invention, FIG. 5 shows a schematic representation of the use of a machine learning algorithm in the method according to the invention, FIG. 6 shows a further schematic overview of the method according to the invention, and FIG. 7 shows a system having a sensing device according to the invention.

FIG. 1 shows a cooking device 8 which has a sensing device 10 and a housing 12 which comprises a closed chamber 14 serving as a cooking chamber and a technical chamber 16.

The closed chamber 14 is part of the sensing device 10, as explained below.

In the embodiment shown, a suspension rack 18 is provided in the closed chamber 14 and comprises a plurality of loading levels 20 on which items to be cooked or an object 22 is arranged.

Furthermore, a fan wheel 24, via which the atmosphere in the closed chamber 14, i.e. the cooking chamber atmosphere in the cooking chamber, can be circulated in a known manner is assigned to the cooking chamber, i.e. the closed chamber 14.

In general, the atmosphere can be created using a hot-air heating device or a steam generator of the cooking device 8, which are not shown here.

In addition, the cooking device 8 or the sensing device 10 comprises a microwave unit 26, which in the embodiment shown has a plurality of microwave sources 28, each of which is assigned to one antenna 30. Via the antennae 30, microwaves can be fed into the closed chamber 14, wherein the antennae 30 are each assigned to a waveguide 32, via which the microwaves, i.e. the electromagnetic waves, are guided, among others, from the respective microwave source 28 to the antenna 30.

Instead of the several microwave sources 28, a single common microwave source may also be provided, via which it is ensured that the several antennae 30 emit coherent electromagnetic waves. If a plurality of microwave sources 28 are provided, as is the case in the embodiment shown in FIG. 1, the several microwave sources 28 may be coupled together to ensure that the electromagnetic radiation or the electromagnetic waves are coherent.

In general, the power of the microwave unit 26 during the process may be in the milli-watt (mW) range, also known as sensor power, which is less than a heating power used to cook the items to be cooked or the object 22.

In addition, a directional coupler unit 34 is assigned to each of the waveguides 32, via which forward electromagnetic waves, i.e. electromagnetic waves travelling from the microwave source 28 to the antenna 30, as well as backward electromagnetic waves, i.e. electromagnetic waves travelling from the antenna 30 to the microwave source 28, can be decoupled.

In general, each directional coupler unit 34 comprises at least one directional coupler for decoupling the electromagnetic waves. In particular, two directional couplers per directional coupler unit 34 are provided to decouple the forward and backward electromagnetic waves.

The directional coupler units 34 are in turn coupled to a control and evaluation unit 36 of the sensing device 10, via which, among other things, the powers of the forward electromagnetic waves $P_v$ or the powers of the backward electromagnetic waves $P_r$ can be detected.

The corresponding powers $P_v$, $P_r$ can also be detected via the directional coupler units 34 themselves, which include an appropriate measuring unit for this purpose. The acquired data may then be transferred to the control and evaluation unit 36.

Irrespective thereof, the corresponding powers $P_v$, $P_r$ can be related to each other, as shown in FIG. 2, in which the ratio $\Gamma_{mn} = P^m_v / P^n_i$ is plotted against the time obtained by time-resolved measurements during one rotation of the fan wheel 24. The indices m, n of the ratio indicate that the respective powers at different antennae 30, namely antenna "m" and antenna "n", have been put in relation to each other.

The powers of the same antenna 30 can also be put into relation to each other. Accordingly, m=n may apply.

FIG. 2 shows the ratio of the power of the forward electromagnetic waves $P_v$ and the power of the backward electromagnetic waves $P_r$ compared with the time taken for the rotation of the fan wheel 24 during operation of the cooking device 8 or the sensing device 10. The electric field generated by the electromagnetic waves or the electromagnetic radiation fed into the closed chamber 14 changes continuously due to the rotation of the (metallic) fan wheel 24, i.e. the spatial distribution of the electric field generated by the electromagnetic radiation. FIG. 2 clearly shows that several rotations of the individual blades of the fan wheel 24 are shown, which may also be referred to as cycles Z.

The recorded measured curve in FIG. 2 even shows that it is possible to ascertain the fan wheel positions, i.e. the various angles of the fan wheel 24 in relation to a neutral position, i.e. a reference position of the fan wheel 24, with respect to which the angular position of the fan wheel 24 can be ascertained. The different fan wheel positions are accompanied by different spatial distributions of the electric field.

The rotating fan wheel 24 therefore acts as a mode mixer for the electromagnetic radiation, i.e. the spatial distribution of the generated electric field.

Since the powers of the forward electromagnetic waves $P_v$ or the powers of the backward electromagnetic waves $P_r$ are constantly measured while the fan wheel 24 is rotating, a series of measurements including several measurements is obtained at respectively different spatial distributions of the electric field generated by the electromagnetic radiation.

As an alternative or in addition to the rotation of the fan wheel 24 to change the spatial distribution of the electric field generated by the electromagnetic radiation, it may be provided that another electrically conductive component moves, the frequency of the electromagnetic radiation (frequency scan), the (relative) power of the electromagnetic radiation and/or the (relative) phase of the electromagnetic radiation is/are changed, i.e. among other things the power or the phase of the electromagnetic radiation emitted by at least two different antennae 30 (relative power or relative phase).

To this end, the control and evaluation unit 36 would control the microwave unit 26, in particular the microwave source(s) 28, accordingly in order to adjust the electromagnetic radiation emitted. If several antennae 30 are present, as in the example embodiment of FIG. 1, the relative phase position or amplitude relation of the electromagnetic waves emitted via the respective antennae 30 can be adjusted accordingly.

However, in the series of measurements shown in FIG. 2, the setting or control parameters of the microwave unit 26 are fixed, as the spatial distribution of the electric field is changed by the movement of an electrically conductive component, namely the fan wheel 24.

FIG. 3 shows how the at least one measured variable, i.e. the ratio ($\Gamma_{mn}$) of the powers of the forward electromagnetic waves and the backward electromagnetic waves, has been recorded for several frequencies $f_1$ to $f_N$ for a specific load of the closed chamber 14. Accordingly, a so-called frequency scan was carried out during the operation of the cooking device 8 or the sensing device 10 designed as a system, in particular during the operation of the fan wheel 24.

In this respect, the spatial distribution of the electric field generated by the electromagnetic radiation has been changed due to the rotation of the fan wheel 24 and the change in frequency of the emitted electromagnetic waves (frequency scan), i.e. due to two control parameters.

In general, the spatial distribution of the electric field generated by the electromagnetic radiation can therefore be modified by setting several parameters, i.e. several control parameters.

The correspondingly obtained measurement results can then be summarized in a distribution as a mathematical representation and then evaluated or grouped and/or partitioned accordingly to obtain at least one evaluation variable from the measurement results, as shown by way of example on the right side of FIG. 3.

The standard deviation of the distribution of the measurement results (frequency distribution) and the integrated measurand of the distribution of the measurement results, i.e. the area under the distribution curve are shown here as evaluation variables. The distribution of the measurement results may initially have been limited to a partial area, which is also known as "partitioning".

A value of a transformation of the measurement results can also be used as an evaluation variable, for example a value of a Fourier transformation of the measurement results or the distribution. A Laplace transformation can also be used as a transformation.

In general, the at least one evaluation variable can be obtained from a mathematical operation, in particular a mathematical representation, of the measurement results and/or a mathematical transformation of the measurement results.

In particular, the evaluation variable can be a joint moment, i.e. a moment comprising several random variables, for example the covariance.

It is also possible to ascertain several evaluation variables which are used individually or in combination with each other to determine the load parameter.

FIG. 4 shows that several evaluation variables can be determined which are incorporated into a mathematical model to ascertain a load parameter of interest of the closed chamber 14 therefrom.

Alternatively or in addition, the at least one evaluation variable, in particular the several evaluation variables, can be fed as an input variable to a pattern recognition which ascertains the at least one load parameter on the basis of the at least one evaluation variable.

The pattern recognition is formed, for example, by an artificial neural network and/or a classification or classifying method. In this respect, the pattern recognition can ascertain the at least one load parameter of interest using artificial intelligence, on the basis of the at least one evaluation variable.

In general, a mathematical model can be an equation, a system of equations or an (applied) machine learning model. The mathematical model can also be a combination of an equation, a system of equations and/or an (applied) machine learning model.

The control and evaluation unit 36 can generally comprise a processor which is configured to use or apply the appropriate mathematical model and/or pattern recognition to ascertain the load parameter from the respective evaluation variables.

In the mathematical model shown in FIG. 4, the standard deviation ($\sigma$) of the distribution of the reflected power and the integrated measurand ($\Sigma R$) of the reflected power, i.e. the total reflected power, is used to infer the volume V of the object 22 as the load parameter of interest or the loading state of the closed chamber 14. This can be represented by a linear function which reads as follows:

$$\Sigma R = A*\sigma + B$$

The parameters A, B represent training parameters or fit parameters that have been ascertained by previous test attempts or tests during a training phase.

In general, the parameters A, B are different for different objects.

The training parameters or fit parameters can be stored in the control and evaluation unit 36 of the sensing device 10, so that the evaluation variables obtained from the evaluation of several measurements of at least one measured variable, in this case the reflected power or the power of the backward electromagnetic waves $P_r$, only need to be inserted to be able to infer the loading state of the closed chamber 14, i.e. the volume of the object 22 as a load parameter of interest.

It is shown that in a simple manner, an empty closed chamber 14, a suspension rack 18 (i.e. cooking accessories or part introduced into the closed chamber 14) in which racks for items to be cooked can be arranged, as well as different volumes of the object 22 can be ascertained on the basis of the integrated measurand $\Sigma R$ of the reflected power and the standard deviation $\sigma$ of the distribution of the reflected power. This can be done in a very short time so that a real-time monitoring is possible.

The applied mathematical model, which uses the training parameters, therefore establishes a relationship between the two evaluation variables, via which the load parameter of interest can be ascertained.

In the example embodiment shown, the volume of the object 22 in the closed chamber 14 is ascertained on the basis of the integrated measurand $\Sigma R$ of the reflected power and the standard deviation $\sigma$ of the distribution of the reflected power, since a pair of values consisting of the integrated measurand $\Sigma R$ and the standard deviation $\sigma$ allows a substantially unambiguous assignment to the volume serving as a load parameter.

However, other evaluation variables can also be used, for example a minimum value of the measurement results, a maximum value of the measurement results, a value of a transformation of the measurement results, and/or another value of the distribution of the measurement results.

In general, a value of a mathematical operation, in particular a mathematical representation, of the measurement results, and/or a value of a mathematical transformation of the measurement results can be used to ascertain the at least one evaluation variable.

The more evaluation variables are used, the more the accuracy can be increased.

It is also possible to use corresponding evaluation variables to ascertain other load parameters that are of interest, namely the object type, the position of the object 22 within the closed chamber 14, the temperature of the object 22, and/or the state of the object.

For this purpose, for example, a correspondingly different pattern recognition and/or a correspondingly different mathematical model would be used that has, for example, other training parameters that reflect the relationships.

It is also possible to infer the position, the quantity and the type of parts in the closed chamber 14, which is also a load parameter.

The load parameter can also be a combination based on characteristics of the object 22 and parts, for example cooking accessories or means of transport, as explained below with reference to FIG. 7.

In the embodiment shown, the ratio ($\Gamma_{mn}$) of the powers of the forward electromagnetic waves and of the backward electromagnetic waves was used as the measured variable.

Other measurement parameters or measured variables that can be measured by the antenna can also be used, for example the amplitude of the electromagnetic waves, the phase of the electromagnetic waves, a network parameter, the power of forward electromagnetic waves and/or the power of backward electromagnetic waves.

Depending on the measured variable (and the evaluation variable derived therefrom), a corresponding mathematical model including training parameters or a pattern recognition would be used to determine the desired load parameter of interest.

In general, it is therefore possible that the evaluation of the at least two measurements is carried out in an automated manner, so that the at least one evaluation variable of interest is ascertained in an automatic way to ascertain the load parameter automatically. It is therefore not necessary for the user or operator of the cooking device 8 or, in general, of the system comprising the sensing device 10 to manually enter the relevant information regarding the loading or charging of the closed chamber 14. Instead, this is automatically detected due to the electromagnetic radiation.

FIG. 5 shows an example of how the measurement results obtained in FIG. 3 can be used to apply a pattern recognition or a machine learning algorithm that includes or uses, for example, a classifier and/or a neural network.

Thus, the spatial distribution of the field generated by the electromagnetic radiation is changed due to the frequency scan and the rotation of the fan wheel 24, which acts as a mode mixer.

As already explained in FIG. 3, evaluation variables are ascertained from the measurement results obtained in the series of measurements, which then serve as input variables for a pattern recognition or the machine learning algorithm, among other things.

In addition, the pattern recognition or the machine learning algorithm is given corresponding load parameters for training, so that the machine learning algorithm is trained in the training phase to learn the relationships between the individual evaluation variables and the load parameters and to be able to apply them later accordingly.

This can be used to determine the training parameter or in general to configure the pattern recognition.

In addition, further data can be combined during the training, for example measured variables from other sensors such as the temperature of the closed chamber 14 and/or the temperature of the object 22.

The pattern recognition or the machine learning algorithm is used, for example, to predict a load parameter on the basis of the pattern recognition, which receives the at least one evaluation variable as an input variable, and/or a corresponding mathematical model, which comprises the at least one evaluation variable and at least one training parameter.

In particular, the machine learning algorithm is adapted to predict the object type, the volume of the object 22 and/or the state of the object 22 during the sensing process.

For this purpose, as already explained, the pattern recognition or machine learning algorithm can be configured to ascertain the at least one training parameter assigned to the mathematical model which is used by the pattern recognition or mathematical model as described above.

The machine learning algorithm or the pattern recognition can also be configured to ascertain the load parameter on the basis of the evaluation variable received as the input variable.

To improve the accuracy of the prediction, the pattern recognition or the machine learning algorithm can still receive the evaluation variables and load parameters ascertained on the basis of the measurement results even after the training phase, so that the pattern recognition or the machine learning algorithm is accordingly trained in a continuous manner.

The machine learning algorithm or the pattern recognition thus also uses the evaluation variables ascertained via the at least one measured variable, wherein several measurements have been carried out at different spatial distributions of the electric field.

In general, the machine learning algorithm or the pattern recognition can ensure that the substantially unambiguous assignment of value pairs formed by evaluation variables to the at least one assigned load parameter is possible in an automated manner, even if slight deviations from the ideal case occur, as shown in FIG. 4 as an example.

The sensing device 10, which for example carries out the pattern recognition or the machine learning algorithm, is accordingly configured to ascertain the at least one training parameter for the mathematical model which comprises the at least one evaluation variable from measurements of the at least one measured variable at different spatial distributions of the electric field.

Accordingly, the sensing device 10 can also be trained on the customer's premises.

Furthermore, the sensing device 10 is generally configured to carry out the above-described method of sensing at least one load parameter of the closed chamber 14.

It is thus possible to infer the at least one load parameter of the closed chamber 14 on the basis of the changing spatial distribution of the electric field generated by electromagnetic radiation during the different measurements, i.e. the object type, the position of the object 22 within the closed chamber 14, the volume of the object 22 and/or the state of the object 22. It is also possible to infer introduced components, for example cooking accessories or means of transport, as the load parameter of.

Due to the electromagnetic radiation used for this purpose and the rapid evaluation thereof, a real-time monitoring is possible in the first place, which is particularly suitable for monitoring the state of the object 22 as a load parameter.

The real-time monitoring also easily permits to detect a change in the load in the closed chamber 14, for example when a new object 22 is introduced. Since it can be ascertained in which position the new object 22 has been inserted, the running processing process of the object 22 can be adjusted accordingly, in particular in real-time or in an automated manner.

The method of sensing the at least one load parameter exploits, among other things, the fact that the microwave absorption of metal or metallic objects, such as gear wheels, metallic transport means, carriers for items to be cooked or general cooking accessories, is relatively small in comparison to the object 22, e.g. items to be cooked serving as object 22.

The influence of the metallic objects on the spatial distribution of the electromagnetic field, on the other hand, is taken into account accordingly, so that this does not represent a disturbance when ascertaining the load parameter. This is due, among other things, to the fact that several measurements are taken and, in addition, that at least one training parameter is taken into account in the mathematical model.

As the electromagnetic radiation also penetrates into the object 22 itself, the corresponding phase transitions or phase changes of the object 22, in particular of the items to be cooked, can thus be detected in a simple manner, allowing the state of object 22 to be determined.

As already mentioned at the beginning, the spatial distribution of the electric field can also be changed by changing the relative power of the electromagnetic radiation and/or by changing the relative phases of the electromagnetic radiation, provided that several antennae 30 are provided, via which the electromagnetic radiation is fed into the closed chamber 14 (simultaneously).

Similarly, in addition to the ratio $\Gamma$ of the powers of the forward electromagnetic waves $P_v$ and of the backward electromagnetic waves $P_r$, the power of the forward electromagnetic waves $P_v$ or the power of the backward electromagnetic waves $P_r$ alone shall be taken into account.

The so-called network parameters can also be used as measured variables, in particular scattering parameters. It is also possible to use phase difference measurements of the backward and forward electromagnetic waves with different pairs of antennae as a measured variable, which can also be described as $\Delta\Phi_{mn}$, where m, n are indices for one of the several antennae 30 and where m is not equal to n.

Instead of the standard deviation of the distribution, the integrated measurand of the distribution and the value of a transformation of the measurement results or the distribution shown in the figures, it is additionally or alternatively possible to use the minimum value of the distribution, the maximum of the distribution, the mean value of the distribution, the variance of the distribution, a symmetry value of the distribution and/or the kurtosis of the distribution, in particular a value of a mathematical representation or a value of a mathematical transformation.

A joint moment can also be used as an evaluation variable.

In general, more than one measured variable can be acquired during the multiple measurements. Several evaluation variables can also be determined by means of classical analysis techniques in order to ascertain at least one load parameter. Consequently, several evaluation variables can be incorporated into the mathematical model.

Furthermore, several load parameters can be ascertained simultaneously on the basis of the several measured variables and/or the several evaluation variables.

In summary, this is shown in the overview in FIG. 6, to which reference is made below.

Between two measurements, the spatial distribution of the electric field is changed by changing one or more control parameters. This may be a change in the frequency of the electromagnetic radiation, the driving a mode mixer or the movement of an electrically conductive component, the change of a relative phase between two antennae, or the change of a relative power between two antennae.

Subsequently, one or more measured variables are detected. The plurality of measured variables may be acquired separately or in combination. The at least one measured variable may be a network parameter, a power of the forward electromagnetic waves, a power of the backward electromagnetic waves, a ratio of the power of the forward to the power of the backward electromagnetic waves, the phase of the forward or backward electromagnetic waves, or the phase ratio of the phases of the forward and backward electromagnetic waves.

The one measured variable or the plurality of measured variables are evaluated by means of a classical analysis technique. Here (optionally) at least one external measured variable from a sensor can be used, for example a temperature of the closed chamber 14 or the temperature of the object 22 detected by sensors, to ascertain at least one evaluation variable.

A classical analysis technique, namely a mathematical operation, in particular a mathematical representation of the measurement results and/or a mathematical transformation of the measurement results, may be used to ascertain the at least one evaluation variable, for example the entropy, the sum, an integral, a probability distribution such as a histogram, a projection, a Taylor series, a Fourier transformation or a Laplace transformation.

The plurality of evaluation variables may be determined separately from each other or in combination.

Subsequently, it may be optionally provided that the at least one evaluation variable that was ascertained before is combined with an external measured variable from a sensor, for example a temperature of the closed chamber 14 or the temperature of the object 22 detected by sensors.

According to one aspect, the evaluation variable, the plurality of evaluation variables or the combined evaluation variable(s) are then incorporated into a (classical) mathematical model, for example an equation, a system of equations or a machine learning model to determine the load parameter of interest.

The mathematical model may also comprise at least one equation, system of equations and/or machine learning model, which are solved or executed separately or in combination to determine the load parameter.

Alternatively or in addition, the evaluation variable, the plurality of evaluation variables or the combined evaluation variable(s) serves as input variable(s) for the pattern recognition which outputs the at least one load parameter of interest. The pattern recognition may be based on artificial intelligence.

To this end, the pattern recognition, which comprises for example an artificial neural network and/or a classification or classifying procedure, has been trained accordingly beforehand.

In each case, the at least one load parameter of interest is ascertained.

The load parameter of interest thus determined can be information about the object 22 in the closed chamber 14 or information about parts, in particular components, in the closed chamber 14. For example, the load parameter comprises information concerning the object type, combinations of different object types and/or parts or components, the position of the at least one object 22 or parts, the temperature of the at least one object 22, the state of the at least one object 22, the quantity of the object 22, the volume of the object 22, and/or the aspect ratio of the object 22.

In general, the pattern recognition can be trained by supplying set training data comprising at least one evaluation variable and at least one actual load parameter.

The at least one evaluation variable has been obtained from measurement results of at least two measurements with respect to at least one measured variable, as described above, i.e. using classical analysis techniques. The measurements have been carried out for at least two different spatial distributions of the electric field generated by electromagnetic radiation.

The training of the pattern recognition, in particular of the artificial neural network, comprises the following training steps:
  forward feeding of the pattern recognition to be trained with the set training data;
  ascertaining of at least one load parameter by means of the pattern recognition;
  determination of an error between the ascertained load parameter and the actual load parameter; and
  change of weighting factors of the pattern recognition by feeding back the pattern recognition with the error.

This allows the pattern recognition to be trained accordingly so that it automatically establishes correlations between the at least one evaluation variable obtained as input variable and at least one load parameter, so that the trained pattern recognition can then output the load parameter exclusively on the basis of at least one input evaluation variable.

Basically, an evaluation variable is used which is sensitive for at least one load parameter of interest, for example the temperature of the object/item to be cooked and/or the quantity, but is invariant for other load parameters which are not of interest (disturbance parameters), for example the position of the object in the closed chamber.

Depending on the load parameters of interest or the disturbance parameters, at least one corresponding evaluation variable is ascertained from the measurement data via the respective mathematical operations/transformations, the corresponding evaluation variable being incorporated into the mathematical model and/or pattern recognition.

FIG. 7 shows a system 38 including a sensing device 10 according to the invention.

The system 38 is, for example, a production, distribution and/or sorting system by means of which objects 22 are produced, processed, transported, sorted and/or distributed.

To this end, the system 38 in the shown embodiment comprises a transport system 40 having corresponding means of transport, for example conveyor belts and drives, wherein the objects 22 are conveyed through the sensing device 10 by means of the transport system 40 to determine corresponding characteristics of the object 22 or the objects 22 in the sensing device 10, which is referred to as the load parameters of the closed chamber 14.

When determining the at least one load parameter of the closed chamber 14 by means of the sensing device 10, the transport system 40 is preferably switched off so that the objects 22 do not move during the short measurement period.

For example, the objects 22 in the system 38 are sorted according to their volume, wherein the volume of the objects 22 is ascertained as the load parameter of the closed chamber 14 in the sensing device 10.

It may also be provided that the number of objects 22 present in the closed chamber 14 is determined as the load parameter via the sensing device 10. For this purpose, the closed chamber 14 can be fed or loaded with objects 22 for a certain period of time. For example, the system 38 is a production system of objects 22 so that the production power of the system 38 can be detected in this way, namely by the number of objects 22 produced in a defined time interval.

Furthermore, the system 22 may be an ice cream production system, wherein the state of the objects 22, i.e. of the ice cream, is detected in the sensing device 10. It is thus detected by means of the electromagnetic radiation whether the produced ice cream is sufficiently cooled and thus frozen, as the state of aggregation is inferred. The microwave radiation intended therefor has a low power which does not heat the ice cream, as already explained above with reference to FIG. 1.

Furthermore, the sensing device 10 may serve to classify the object 22 or objects 22, provided that several different objects 22 or goods are produced in the connected system 38. Based on the classification, i.e. the determination of the object type, the objects 22 can then be automatically sorted accordingly.

The sensing device 10 may be designed as in the previously described embodiment for a cooking device 8 to scan the corresponding object 22 in the closed chamber 14 of the sensing device 10 by means of electromagnetic radiation, so that at least one load parameter of the closed chamber 14 is sensed or determined by measuring and accordingly evaluating at least one measured variable at two different spatial distributions of the electromagnetic field.

In this respect, the sensing device 10 comprises a closed chamber 14, so that the microwaves (electromagnetic radiation) provided for the method are confined. As shown in FIG. 7, at least one antenna 30, in particular a plurality of antennae 30 is assigned to the at least closed chamber 14.

In addition, the sensing device 10 comprises a microwave unit 26, which in the embodiment shown includes a plurality of microwave sources 28 by means of which the electromagnetic radiation is provided, which is fed into the closed chamber 14 via the antennae 30, as described above.

In the sensing device 10 according to the use shown in FIG. 7, the method of sensing the at least one load parameter of the closed chamber 14 is carried out in a manner analogous to the above explanations regarding the use of the sensing device 10 in a cooking device 8, so that reference is made accordingly to the above explanations, in particular with regard to FIGS. 1 to 6.

In principle, a computer program having program code means may be provided to carry out the steps of the above-mentioned method, i.e. the method of training a pattern recognition and/or the method of sensing at least one load parameter, if the computer program is executed on a computing unit or an appropriate control and evaluation unit 36, in particular the control and evaluation unit 36 of the sensing device 10 described above.

The computer program may be stored on a computer-readable data carrier.

The invention claimed is:

1. A method of sensing at least one load parameter of a closed chamber by an electromagnetic radiation sensing device that comprises a microwave unit with at least one microwave source that is assigned to at least one antenna, via which microwaves are fed into the closed chamber, wherein measurements of at least one measured variable are used, wherein:
   performing a first measurement by a control and evaluation unit when there is a first spatial distribution of the electric field generated in the closed chamber by electromagnetic radiation,
   performing at least a second measurement by the control and evaluation unit when there is a second spatial distribution of the electric field generated in the same closed chamber by the electromagnetic radiation, which differs from the first spatial distribution of the electric field in the same closed chamber, and
   evaluating the at least two measurements with regard to the at least one measured variable by the control and evaluation unit, wherein at least one of a mathematical operation or mathematical transformation is used or applied in an automated manner to obtain at least one evaluation variable from the measurement results by which the load parameter is determined by applying a pattern recognition which includes at least one of the at least one evaluation variable as an input variable, or a mathematical model which comprises at least one evaluation variable and at least one training parameter that has been ascertained based on previous tests, wherein the at least one load parameter is detected via the electromagnetic radiation by performing a plurality of measurements at different spatial distributions of the electric field, and wherein the control and evaluation unit has a processor that is configured to use or apply the appropriate mathematical model and/or the pattern recognition to ascertain the at least one load parameter from the at least one evaluation variable.

2. The method according to claim 1, wherein the spatial distribution of the electric field generated by the electromagnetic radiation is changed by modifying the spatial distribution of the electric field by a movement of an electrically conductive component, a mode mixer, the frequency of the electromagnetic radiation, the power of the electromagnetic radiation, or the phase of the electromagnetic radiation.

3. The method according to claim 2, wherein a fan wheel arranged in the closed chamber is used as the mode mixer.

4. The method according to claim 1, wherein the at least one measured variable is the amplitude, the phase, a network parameter, the power of forward electromagnetic waves, the power of backward electromagnetic waves, or the ratio of the powers of the forward electromagnetic waves and of the backward electromagnetic waves.

5. The method according to claim 1, wherein a plurality of antennas are provided, each of which feed electromagnetic waves into the closed chamber.

6. The method according to claim 5, wherein the electromagnetic waves are coherent electromagnetic waves.

7. The method according to claim 5, wherein the phase reference of the electromagnetic waves fed into the closed chamber by the plurality of antennas during the measurement is fixed.

8. The method according to claim 1, wherein the at least one load parameter is the object type, the position of the object within the closed chamber, the volume of the object, the quantity of the object, the temperature of the object, the aspect ratio of the object, the number of objects or the state of the object.

9. The method according to claim 1, wherein the at least one load parameter comprises information regarding parts present in the closed chamber.

10. The method according to claim 1, wherein the at least one evaluation variable is a minimum value of the measurement results, a maximum value of the measurement results, a value of a mathematical transformation of the measurement results or a value of a mathematical representation of the measurement results, in particular a joint moment, a value of the distribution of the measurement results, a derivative, a gradient, the integrated measurand, a probability distribution such as a histogram and/or parameters of the probability distribution or of the histogram, for example the mean value, the variance, a symmetry value, the kurtosis, or the standard deviation, at least one parameter of the information theory such as the entropy, the joint entropy, the conditional entropy, the differential entropy, the mutual information or the Kullback-Leibler divergence, a sum, a projection, and/or a Taylor representation.

11. The method according to claim 1, wherein a plurality of evaluation variables are determined which are incorporated into the pattern recognition or the mathematical model.

12. The method according to claim 11, wherein the pattern recognition or the mathematical model establishes a correlation between at least two evaluation variables, by which the load parameter is inferred.

13. The method according to claim 1, wherein a plurality of evaluation variables are determined which, among others, are used as input parameters for a machine learning algorithm.

14. The method according to claim 13, wherein the at least one training parameter is ascertained by the machine learning algorithm.

15. The method according to claim 1, wherein the evaluation of the at least two measurements is effected in an automated manner, so that the at least one evaluation variable is determined in an automatic way in order to ascertain the load parameter automatically.

16. A method of training a pattern recognition, wherein the pattern recognition is used in the method according to claim 1, wherein a set of training data is used that comprises at least one evaluation variable and at least one actual load parameter, wherein the at least one evaluation variable has been obtained from measurement results of at least two measurements with regard to at least one measured variable by mathematical operations or mathematical transformations, wherein the measurements have been carried out at two different spatial distributions of the electric field generated by electromagnetic radiation, comprising the following training steps:
feeding forward of the pattern recognition to be trained with the set training data;
ascertaining of at least one load parameter by the pattern recognition;
determination of an error between the ascertained load parameter and the actual load parameter; and
change of weighting factors of the pattern recognition by feeding backward the pattern recognition with the error.

17. A sensing device for a system, comprising a closed chamber and a control and evaluation unit, wherein the sensing device, is configured to carry out a method according to claim 1 and to ascertain at least one training parameter for a mathematical model comprising at least one evaluation variable from measurements of at least one measured variable at different spatial distributions of an electric field generated by electromagnetic radiation fed in.

18. A computer-readable data carrier on which a computer program having program code for carrying out the steps of a method of sensing when the computer program is executed on a computing unit or a corresponding control and evaluation unit, wherein the method of sensing at least one load parameter of a closed chamber by an electromagnetic radiation sensing device that comprises a microwave unit with at least one microwave source that is assigned to at least one antenna, via which microwaves are fed into the closed chamber, wherein measurements of at least one measured variable are used, wherein:
performing a first measurement by a control and evaluation unit when there is a first spatial distribution of the electric field generated in the closed chamber by electromagnetic radiation,
performing at least a second measurement by a control and evaluation unit when there is a second spatial distribution of the electric field generated in the same closed chamber by the electromagnetic radiation, which differs from the first spatial distribution of the electric field in the same closed chamber, and
evaluating the at least two measurements with regard to the at least one measured variable by the control and evaluation unit, wherein at least one of a mathematical operation or mathematical transformation is used or applied in an automated manner to obtain at least one evaluation variable from the measurement results by which the load parameter is determined by applying a pattern recognition which includes at least one of the at least one evaluation variable as an input variable, or a mathematical model which comprises at least one evaluation variable and at least one training parameter that has been ascertained based on previous tests, wherein the at least one load parameter is detected via the electromagnetic radiation by performing a plurality of measurements at different spatial distributions of the electric field, and wherein the control and evaluation unit has a processor that is configured to use or apply the appropriate mathematical model and/or the pattern recognition to ascertain the at least one load parameter from the at least one evaluation variable.

19. A computer-readable data carrier according to claim 18, wherein the control and evaluation unit is a control and evaluation unit of a sensing device for a system, comprising a closed chamber and a control and evaluation unit, wherein the sensing device is configured to carry out the method of sensing or to ascertain at least one training parameter for a mathematical model comprising at least one evaluation variable from measurements of at least one measured variable at different spatial distributions of an electric field generated by electromagnetic radiation fed in.

* * * * *